UNITED STATES PATENT OFFICE.

ANDRÉ SABATIER, OF NEW YORK, N. Y.

IMPROVED VARNISH.

Specification forming part of Letters Patent No. 27,833, dated April 10, 1860.

*To all whom it may concern:*

Be it known that I, ANDRÉ SABATIER, of the city, county, and State of New York, have invented a new and useful Black Varnish for Leather and other Substances; and I do hereby declare that the following is a full, clear, and exact statement of the component parts of and manner of compounding the same.

The component parts are as follows: alcohol, one and a half ($1\frac{1}{2}$) pint; spirits of turpentine, one and a half ($1\frac{1}{2}$) gill; alkanet, one (1) ounce; sulphate of iron, one (1) ounce; gum-benzoin, one (1) ounce; gum-sandarac, four (4) ounces; lamp-black, one-quarter ($\frac{1}{4}$) ounce. The solid matters, with the exception of the lamp-black, are all pulverized and put into the mixture of alcohol and spirits of turpentine, with about four ounces of pounded glass, and the whole is well stirred till all the solid matters (but the glass) are dissolved, when the solution is strained through a piece of flannel. The lamp-black is then put into a vessel with a small quantity of the solution, and these are stirred and rubbed together with a brush till well mixed, when the mixture is strained through a sieve or perforated metal strainer, and then added to the remainder of the solution, and the whole agitated together till the lamp-black is thoroughly distributed throughout the solution. The varnish is now ready for immediate use, and may be applied with a brush, like any other varnish, to boots and shoes, harness, military furniture, or other articles of leather, or to articles of wood or metal, drying in about five minutes, and when dry having a beautiful black color and a high degree of luster, being capable of resisting the action of water and not liable to crack.

In this varnish the alcohol is the principle solvent. The spirits of turpentine aids in uniting the gums together, and makes the varnish dry, softer, and gives it a greater degree of adhesion to the substances to which it is applied than if made with alcohol alone. The sulphate of iron combines with the alkanet as a mordant to give a deep red color, which aids the lamp-black in producing a rich black tint. The gum-sandarac gives the varnish its body and luster, and the gum-benzoin renders it less brittle and neutralizes in a great degree the unpleasant odor of the turpentine. The pounded glass divides the gums and assists mechanically in their dissolution by preventing their agglomeration, and also serves to collect their impurities, which are removed with it by the first straining. The oily property of the lamp-black makes the varnish supple when dry.

I do not confine myself strictly to the precise proportions of the several ingredients herein specified, as they may be varied to a certain extent without materially affecting the character of the varnish; but I have given those proportions which experiment has shown to be the best.

What I claim as my invention, and desire to secure by Letters Patent, is—

The varnish composed of the several ingredients herein specified, in about the proportions set forth.

A. SABATIER.

Witnesses:
B. GRIOUXE,
M. M. LIVINGSTON.